United States Patent
Yin et al.

(10) Patent No.: US 11,971,557 B2
(45) Date of Patent: Apr. 30, 2024

(54) OPTICAL PROCESSING APPARATUS, CAMERA MODULE, ELECTRONIC DEVICE AND CAPTURING METHOD

(71) Applicant: BEIJING XIAOMI MOBILE SOFTWARE CO., LTD., Beijing (CN)

(72) Inventors: Zhidong Yin, Beijing (CN); Zongbao Yang, Beijing (CN); Hui Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 363 days.

(21) Appl. No.: 17/213,001

(22) Filed: Mar. 25, 2021

(65) Prior Publication Data

US 2021/0405384 A1    Dec. 30, 2021

(30) Foreign Application Priority Data

Jun. 30, 2020 (CN) .......................... 202010630613.9

(51) Int. Cl.
| | |
|---|---|
| *G02B 27/14* | (2006.01) |
| *G02B 27/10* | (2006.01) |
| *H04N 23/55* | (2023.01) |
| *H04N 23/80* | (2023.01) |

(52) U.S. Cl.
CPC ......... *G02B 27/1006* (2013.01); *H04N 23/55* (2023.01); *H04N 23/80* (2023.01)

(58) Field of Classification Search
CPC .... G02B 27/1006; G02B 33/02; G02B 33/12; G02B 33/00; G02B 27/10; G02B 27/141; G02B 27/14; H04N 23/55; H04N 23/80; H04N 23/54; H04N 23/951; H04N 5/225; H04N 5/232; G03B 33/02; G03B 33/12; G03B 33/00
See application file for complete search history.

(56) References Cited

U.S. PATENT DOCUMENTS

| | | | |
|---|---|---|---|
| 4,323,918 A | 4/1982 | Bendell | |
| 6,542,193 B1 * | 4/2003 | Yoshikawa | .......... G02B 27/145 348/338 |

(Continued)

FOREIGN PATENT DOCUMENTS

| | | |
|---|---|---|
| CN | 1637463 A | 7/2005 |
| CN | 204963859 U | 1/2016 |

(Continued)

OTHER PUBLICATIONS

European Search Report in the European Application No. 21164818.3, dated Aug. 18, 2021, (57p).

(Continued)

*Primary Examiner* — Balram T Parbadia
(74) *Attorney, Agent, or Firm* — Arch & Lake LLP

(57) ABSTRACT

An optical processing apparatus includes: a light splitting assembly, disposed on an optical path of an incident light, and configured to receive the incident light and split the incident light into at least two waveband lights, a difference between optical path lengths of the at least two waveband lights being less than a set threshold; and a light sensing assembly, disposed on optical paths of the at least two waveband lights, and configured to receive the at least two waveband lights.

19 Claims, 8 Drawing Sheets

(56) References Cited

U.S. PATENT DOCUMENTS

| | | | |
|---|---|---|---|
| 6,604,828 B2* | 8/2003 | Lu | H04N 9/3105 |
| | | | 348/E9.027 |
| 7,468,748 B2 | 12/2008 | Iwasawa | |
| 8,764,633 B2 | 7/2014 | Mcdowall | |
| 2004/0160578 A1* | 8/2004 | Lu | G03B 21/14 |
| | | | 353/20 |
| 2006/0114417 A1* | 6/2006 | Lee | G03B 33/06 |
| | | | 353/33 |
| 2010/0264299 A1* | 10/2010 | Nakasendo | G02B 27/141 |
| | | | 156/154 |
| 2013/0041215 A1 | 2/2013 | Mcdowall | |
| 2014/0228639 A1 | 8/2014 | McDowall | |
| 2018/0376113 A1 | 12/2018 | Gong | |
| 2021/0030263 A1 | 2/2021 | Kikuchi et al. | |

FOREIGN PATENT DOCUMENTS

| | | | | |
|---|---|---|---|---|
| CN | 107121783 A | 9/2017 | | |
| CN | 108572497 A | 9/2018 | | |
| CN | 209170522 U | 7/2019 | | |
| WO | 2019187874 A1 | 10/2019 | | |
| WO | WO-2019187874 A1 * | 10/2019 | | A61B 1/00009 |

OTHER PUBLICATIONS

First Office Action of the European application No. 21164818.3, issued on Feb. 27, 2024. 6 pages.

* cited by examiner

OPTICAL PROCESSING APPARATUS, CAMERA MODULE, ELECTRONIC DEVICE AND CAPTURING METHOD

CROSS-REFERENCE TO RELATED APPLICATION

The present application is filed based upon and claims priority to Chinese Patent Application 202010630613.9, filed on Jun. 30, 2020, the contents of which are incorporated herein by reference in their entirety for all purposes.

TECHNICAL FIELD

The present disclosure relates to optical path processing technologies of cameras, and more particularly, to an optical processing apparatus, a camera module, an electronic device and a capturing method.

BACKGROUND

In order to improve the amount of light entering a camera in an electronic device, a series of developments have been made in industry, including but not limited to the use of color+black-and-white image sensors, the use of enhanced array image sensors and the like. Regardless of whatever mode is, optical distances of the image sensors for sensing light rays are different, which results in chromatic aberration during restoration of image colors and deterioration of image quality of the image captured by an imaging system.

SUMMARY

The present disclosure provides an optical processing apparatus, a camera module, an electronic device and a capturing method.

According to a first aspect of the examples of the present disclosure, an optical processing apparatus is provided, which may include: a light splitting assembly, disposed on an optical path of an incident light, and configured to receive the incident light and split the incident light into at least two waveband lights, a difference between optical path lengths of the at least two waveband lights being less than a set threshold; and a light sensing assembly, disposed on optical paths of the at least two waveband lights, and configured to receive the at least two waveband lights.

According to a second aspect of the examples of the present disclosure, a camera module is provided, which may include: a lens group, configured to focus an object to be captured, collect reflected light of the object to be captured and output the reflected light to an optical processing apparatus; and the foregoing optical processing apparatus, configured to receive an incident light output by the lens group.

According to a third aspect of the examples of the present disclosure, an image capturing method is provided, which may include that: a first input is received; and in response to the first input, at least two frames of images formed by respectively sensing at least two waveband lights are acquired, a difference between optical path lengths of respective waveband lights in a light splitting assembly being less than a set threshold; and a target image of the captured object is generated according to the at least two frames of images.

It is to be understood that the above general descriptions and detailed descriptions below are only example and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure.

Figure 1:
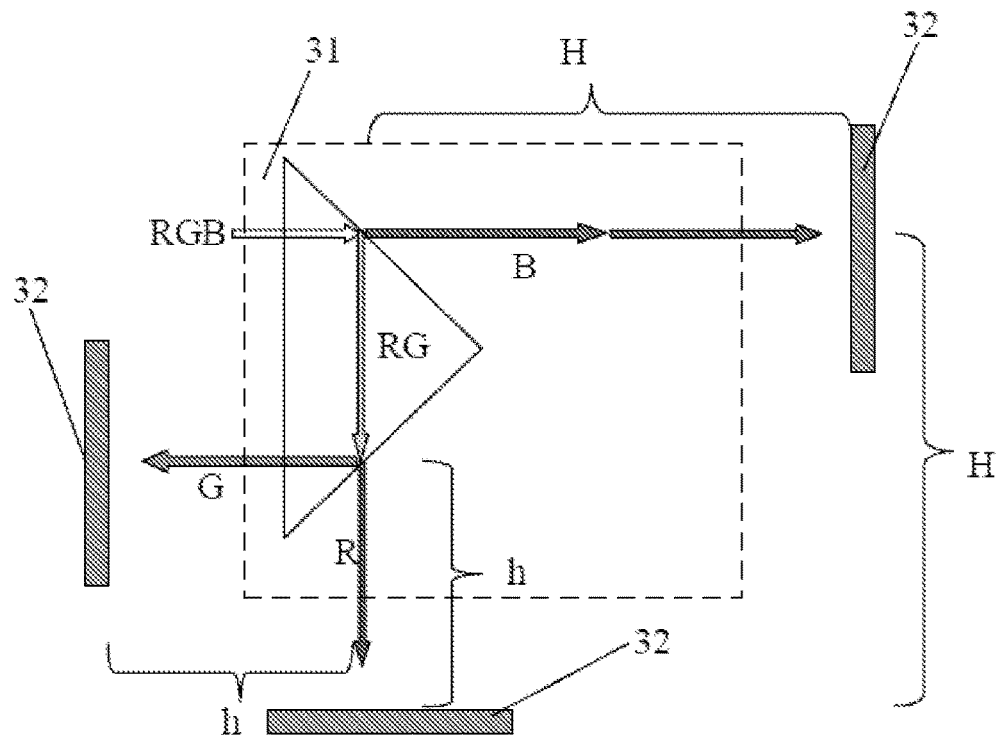
FIG. 1 is a structural diagram showing an optical processing apparatus according to an example of the present disclosure.

FIG. 1 is a structural diagram showing an optical processing apparatus according to an example of the present disclosure. As shown in FIG. 1, the optical processing apparatus in the example of the present disclosure may include a light splitting assembly 31 and a light sensing assembly 32.

The light splitting assembly 31 is disposed on an optical path of an incident light, and configured to receive the incident light and split the incident light into at least two waveband lights.

The light sensing assembly 32 is disposed on optical paths of the at least two waveband lights, and configured to receive the at least two waveband lights.

A difference between optical path lengths of the at least two waveband lights is less than a set threshold, i.e., optical distances of respective waveband lights after the incident light is split are equal.

In the example of the present disclosure, optical distances of respective waveband lights are equal, which refers to that optical distances of respective waveband lights of the at least two waveband lights in the light splitting assembly 31 are equal, and optical path lengths of respective waveband lights of the at least two waveband lights in a component of the light splitting assembly 31 are equal.

As an optimal implementation mode, optical path lengths of respective waveband lights of the at least two waveband lights between the light splitting assembly 31 and the light sensing assembly 32 are equal, i.e., in addition to the case that optical path lengths of respective waveband lights of the at least two waveband lights in the component of the light splitting assembly 31 are equal, it is preferable that optical path lengths of respective waveband lights between the light splitting assembly 31 and the light sensing assembly 32 are also equal, such that when each of the at least two waveband lights enters the light sensing assembly 32, the conditions regarding the passed transmission medium and transmission path are completely the same. In this way, when the image is restored by using each waveband light entering the light sensing assembly 32, chromatic aberration in the image is fully prevented.

As an optimal implementation mode, optical path lengths of respective waveband lights of the at least two waveband lights in the light splitting assembly 31 are equal, optical path lengths of respective waveband lights of the at least two waveband lights from the incident surface of the incident light to the light sensing assembly 32 are also equal, and optical path lengths of respective waveband lights between the light splitting assembly 31 and the light sensing assembly 32 are also equal.

Figure 2A:
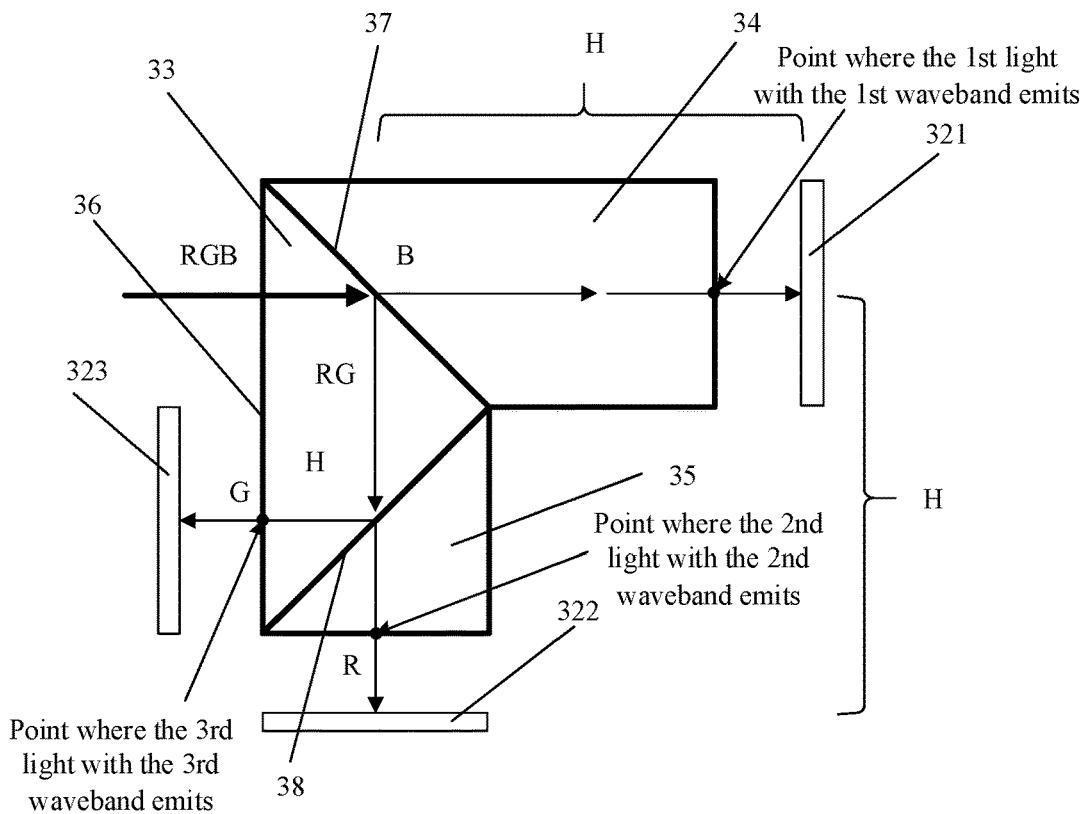
FIG. 2A is a structural diagram showing an optical processing apparatus according to an example of the present disclosure.

FIG. 2A is a structural diagram showing an optical processing apparatus according to an example of the present disclosure. As shown in FIG. 2A, the light splitting assembly 31 in the example of the present disclosure may include a light splitting element 33.

The light splitting element 33 is disposed on the optical path of the incident light, and configured to split the incident light into a first waveband light, a second waveband light and a third waveband light.

A difference between optical path lengths of the first waveband light, the second waveband light and the third waveband light is less than a set threshold, i.e., optical distances of the first waveband light, the second waveband light and the third waveband light are equal. As an optimal mode, the optical distances of the first waveband light, the second waveband light and the third waveband light are completely equal.

The optical path lengths of the first waveband light, the second waveband light and the third waveband light in the light splitting assembly 31 are equal, the optical path lengths of the first waveband light, the second waveband light and the third waveband light from the incident surface of the incident light to the light sensing assembly 32 are also equal, and optical paths of the first waveband light, the second waveband light and the third waveband light between the light splitting assembly 31 and the light sensing assembly 32 are also equal.

The light splitting element 33 in the example of the present disclosure has an incident surface 36, a first surface 37 and a second surface 38. The incident surface 36 is located on the optical path of the incident light, and configured to transmit the incident light. A first light splitting reflection layer is disposed on the first surface 37. The first light splitting reflection layer is located on a transmission path of the incident light, and configured to split the incident light into the first waveband light along the first optical path and reflect a fourth waveband light along a fourth optical path. The fourth optical path is illustrated in FIG. 2E. A second light splitting reflection layer is disposed on the second surface 38. The second light splitting reflection layer is located on the fourth optical path, and configured to split the fourth waveband light into the second waveband light along a second optical path and reflect the third waveband light along a third optical path.

In the example of the present disclosure, the first light splitting reflection layer may be a metal coating film, a nonmetal coating film or a mixed layer structure of metal and nonmetal coating films provided that transmission of the blue (B) light and reflection of the red-green (RG) hybrid light can be implemented. The second light splitting reflection layer may be a metal coating film, a nonmetal coating film or a mixed layer structure of metal and nonmetal coating films provided that transmission of the Red® light and reflection of the green (G) light can be implemented.

The light splitting assembly 31 in the example of the present disclosure may further include a first optical path compensation element 34 and a second optical path compensation element 35.

The first optical path compensation element 34 is disposed on a light emitting path of the first waveband light, and configured to compensate an optical path of the first waveband light.

The second optical path compensation element 35 is disposed on a light emitting path of the second waveband light, and configured to compensate an optical path of the second waveband light.

In the example of the present disclosure, the first optical path compensation element 34 and the second optical path compensation element 35 are provided such that the optical distances of the first waveband light, the second waveband light and the third waveband light in the light splitting assembly 31 are equal, the optical distances of the first waveband light, the second waveband light and the third waveband light in the light splitting element 33, the first optical path compensation element 34 and the second optical path compensation element 35 are equal, and the optical distances of the first waveband light, the second waveband light and the third waveband light in an optical component such as a glass medium are equal.

Specifically, the first optical path compensation element 34 is attached to the first surface 37, and the second optical path compensation element 35 is attached to the second surface 38.

Optical path lengths of the first optical path, the second optical path and the third optical path are equal.

Figure 2B:
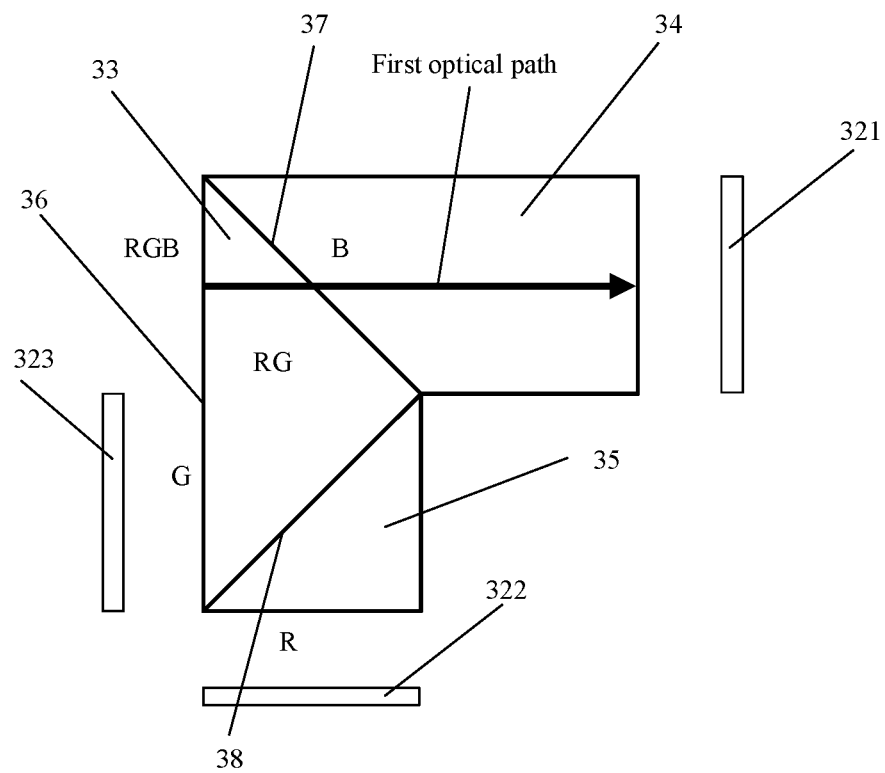
FIG. 2B is a structural diagram showing a first optical path according to an example of the present disclosure.

As illustrated in FIG. 2B, the first optical path is an optical path of the first waveband light from the incident surface 36 to the first optical path compensation element 34 where the first waveband light emits.

Figure 2C:
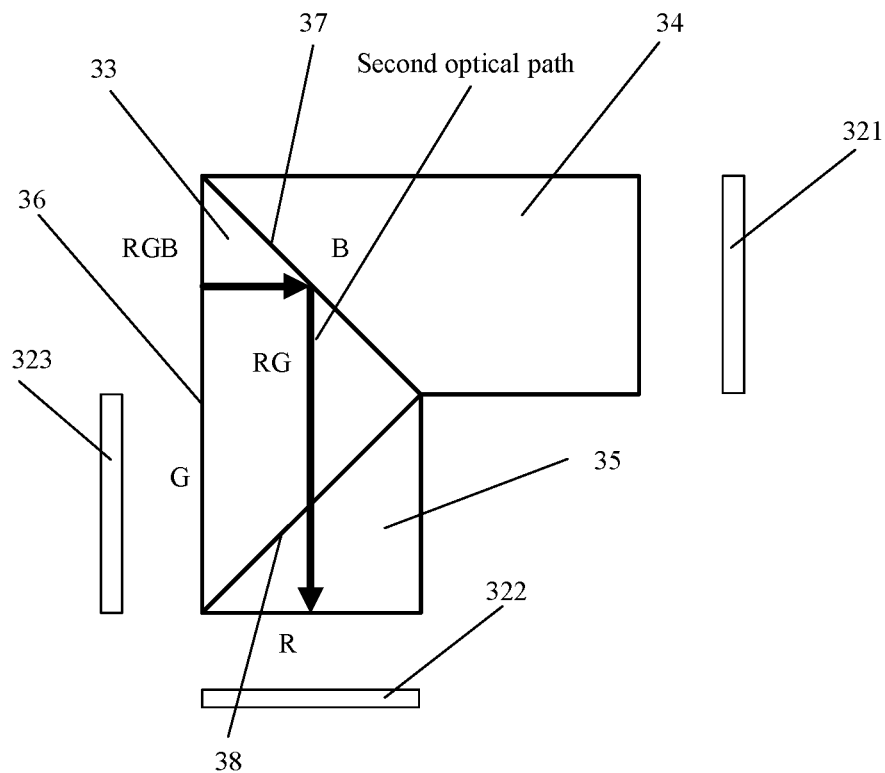
FIG. 2C is a structural diagram showing a second optical path according to an example of the present disclosure.

As illustrated in FIG. 2C, the second optical path is an optical path of the second waveband light from the incident surface 36 to the second optical path compensation element 35 where the second waveband light emits.

Figure 2D:
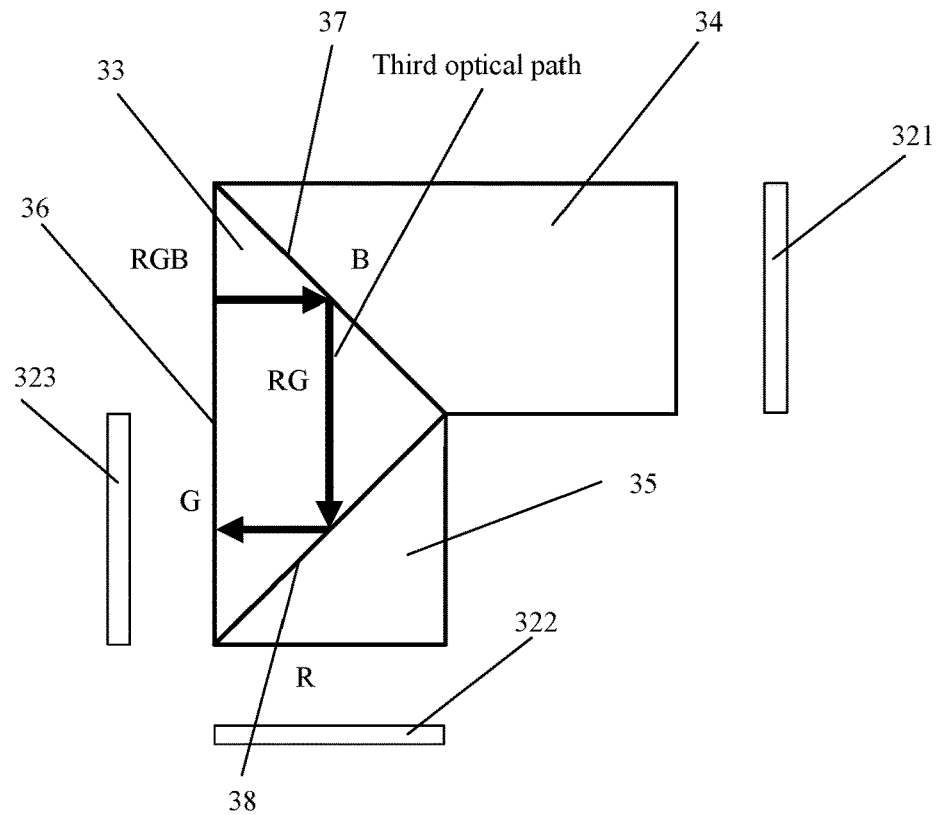
FIG. 2D is a structural diagram showing a third optical path according to an example of the present disclosure.
Figure 2E:
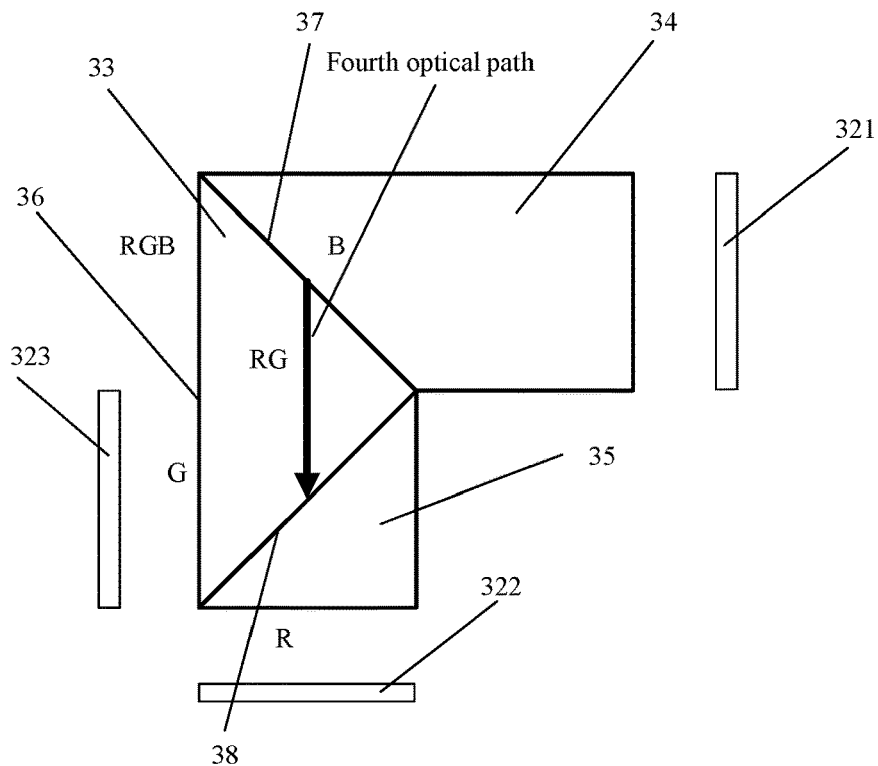
FIG. 2E is a structural diagram showing a fourth optical path according to an example of the present disclosure.

As illustrated in FIG. 2D, the third optical path is an optical path of the third waveband light from the incident surface 36 to the light splitting element 33 where the third waveband light emits.

In the example of the present disclosure, a difference between optical path lengths of the first waveband light, the second waveband light and the third waveband light in the component of the light splitting assembly 31 is less than a set threshold.

The optical path of the first waveband light in the component of the light splitting assembly 31 is the optical path of the first waveband light from the incident surface 36 to the first optical path compensation element 34 where the first waveband light emits; and the optical path herein corresponds to the first optical path.

The optical path of the second waveband light in the component of the light splitting assembly 31 is the optical path of the second waveband light from the incident surface 36 to the second optical path compensation element 35 where the second waveband light emits; and the optical path herein corresponds to the second optical path.

The optical path of the third waveband light in the component of the light splitting assembly 31 is the optical path of the third waveband light from the incident surface 36 to the light splitting element 33 where the third waveband light emits; and the optical path herein corresponds to the third optical path.

As shown in FIG. 2A, the light sensing assembly 32 in the example of the present disclosure may include a first optical sensor 321, a second optical sensor 322 and a third optical sensor 323.

The first optical sensor 321 is configured to receive the first waveband light.

The second optical sensor 322 is configured to receive the second waveband light.

The third optical sensor 323 is configured to receive the third waveband light.

Lengths of a fifth optical path of the first waveband light, a sixth optical path of the second waveband light and a seventh optical path of the third waveband light are equal.

Figure 2F:
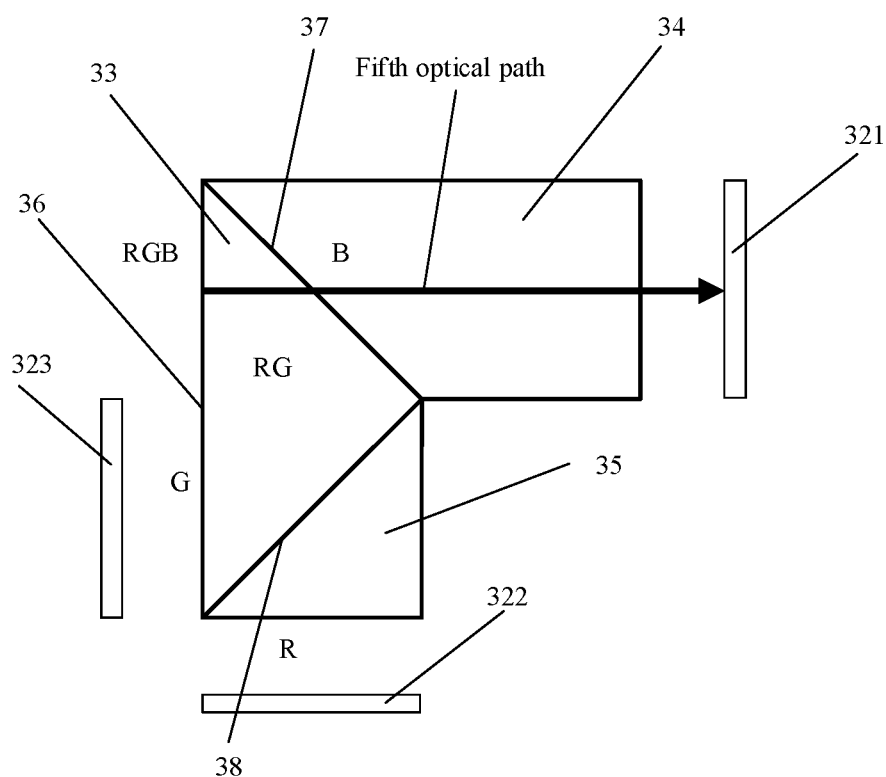
FIG. 2F is a structural diagram showing a fifth optical path according to an example of the present disclosure.

As illustrated in FIG. 2F, the fifth optical path is an optical path of the first waveband light from an incident position of the light splitting element 33 to a receiving position of the first optical sensor 321.

Figure 2G:
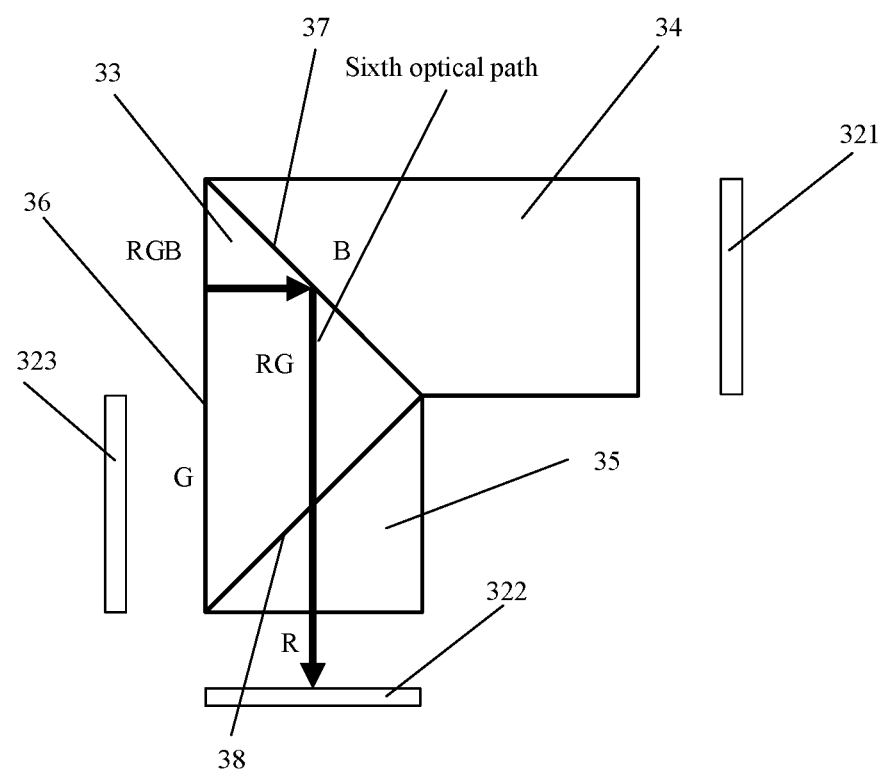
FIG. 2G is a structural diagram showing a sixth optical path according to an example of the present disclosure.

As illustrated in FIG. 2G, the sixth optical path is an optical path of the second waveband light from the incident position of the light splitting element 33 to a receiving position of the second optical sensor 322.

Figure 2H:
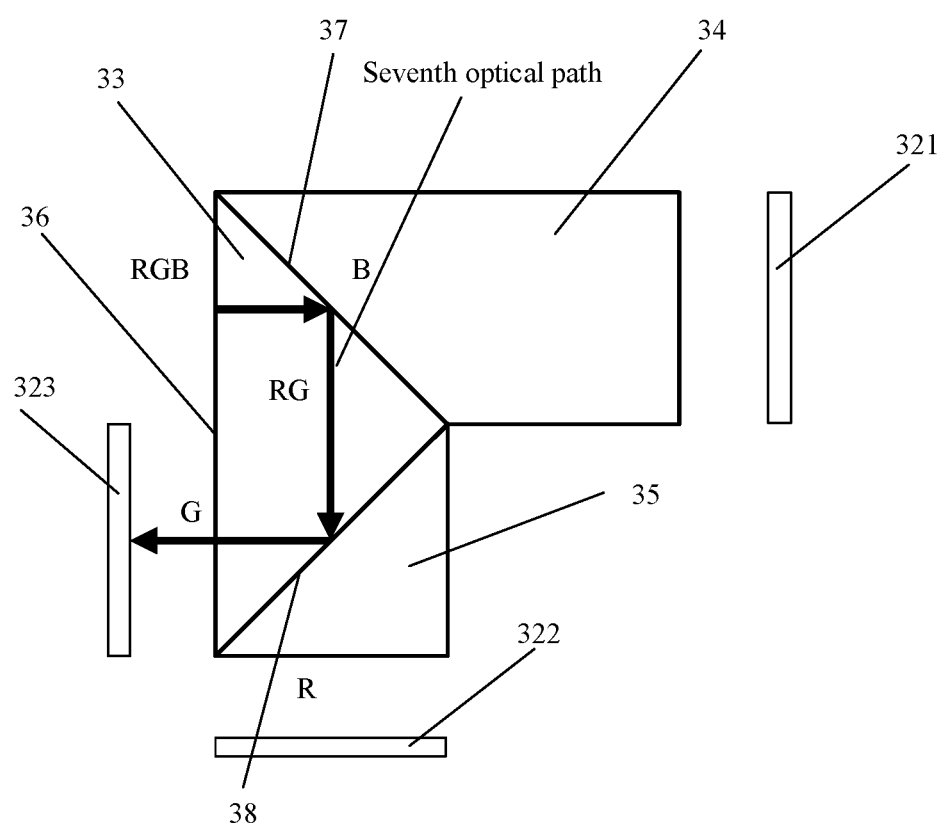
FIG. 2H is a structural diagram showing a seventh optical path according to an example of the present disclosure.

As illustrated in FIG. 2H, the seventh optical path is an optical path of the third waveband light from the incident position of the light splitting element 33 to a receiving position of the third optical sensor 323.

Herein, the fifth optical path is an optical path including the first optical path, the fifth optical path is more than the first optical path by a first length, and the first length is an optical path length of the first waveband light between the first optical sensor 321 and the first optical path compensation element 34.

The sixth optical path is an optical path including the second optical path, the sixth optical path is more than the second optical path by a second length, and the second length is an optical path length of the second waveband light between the second optical sensor 322 and the second optical path compensation element 35.

The seventh optical path is an optical path including the third optical path, the seventh optical path is more than the third optical path by a third length, and the third length is an optical path length of the third waveband light between the third optical sensor 323 and the light splitting element 33.

That is, in the example of the present disclosure, the optical path length of the first waveband light received by the first optical sensor 321, the optical path length of the second waveband light received by the second optical sensor 322 and the optical path length of the third waveband light received by the third optical sensor 323 are equal. The optical path length of the first waveband light received by the first optical sensor 321 is the optical path length from the incidence position of the light splitting element 33 to the receiving position of the first optical sensor 321, and the optical path length is equal to the length of the fifth optical path.

The optical path length of the second waveband light received by the second optical sensor 322 is the optical path length from the incidence position of the light splitting element 33 to the receiving position of the second optical sensor 322. The optical path length is equal to the length of the sixth optical path.

The optical path length of the third waveband light received by the third optical sensor 323 is the optical path length from the incidence position of the light splitting element 33 to the receiving position of the third optical sensor 323. The optical path length is equal to the length of the seventh optical path.

In the example of the present disclosure, the first waveband light is one of an R primary color light, a G primary color light and a B primary color light; the second waveband light is one of the R primary color light, the G primary color light and the B primary color light; and the third waveband light is one of the R primary color light, the G primary color light and the B primary color light.

The first waveband light, the second waveband light and the third waveband light are different from each other.

In FIG. 1 and FIG. 2A, H represents a distance between the first surface 37 to which the incident light enters and the first optical sensor 321 to which the first waveband light enters; the distance is also a distance between the first surface 37 to which the incident light enters and the second optical sensor 322 to which the second waveband light enters, and certainly, is also a distance between the first surface 37 to which the incident light enters and the third optical sensor 323 to which the third waveband light enters. h represents a distance between the second surface 38 to which the fourth waveband light enters and the second optical sensor 322 to which the second waveband light enters; and the distance is also a distance between the second surface 38 to which the fourth waveband light enters and the third optical sensor 323 to which the third waveband light enters.

In the example of the present disclosure, the light splitting element 33 is a light splitting prism, the first optical path compensation element 34 is a prism, and the second optical path compensation element 35 is a prism.

The first optical sensor 321, the second optical sensor 322 and the third optical sensor 323 are all black-and-white image sensors. Herein, the first optical sensor 321, the second optical sensor 322 and the third optical sensor 323 are all the black-and-white sensors.

In the example of the present disclosure, the incident light is split into primary color light, and after the primary color light is acquired by each optical sensor in the light sensing assembly 32, various colors in the image may be composited. RGB primary color lights in the incident light are split by the light splitting assembly 31 to form R, G and B primary color lights, and optical path lengths of the three primary color lights in the light splitting assembly 31 are completely equal.

As shown in FIG. 2A, in the example, the G primary color light enters to the light splitting element 33 from the incident surface 36, and is reflected by the first light splitting reflection layer on the first surface 37, still transmitted in the light splitting element 33, reflected by the second light splitting reflection layer on the second surface 38, and emits from the incident surface 36 along a direction basically reverse to the incident direction.

The B primary color light enters to the light splitting element 33 from the incident surface 36, and is transmitted by the first light splitting reflection layer on the first surface 37. The transmitted B primary color light is transmitted in the first optical path compensation element 34 and emits from the first optical path compensation element 34.

The R primary color light enters to the light splitting element 33 from the incident surface 36, and is reflected by the first light splitting reflection layer on the first surface 37 and still transmitted in the light splitting element 33. Herein, the R primary color light and the G primary color light are jointly transmitted in the light splitting element 33, and the R primary color light is transmitted by the second light splitting reflection layer on the second surface 38 and emits from the second optical path compensation element 35.

In the example of the present disclosure, by arranging the light splitting element 33, the R, G and B primary color lights may be split, such that the camera module in the electronic device is designed to be smaller.

In the example of the present disclosure, the light splitting assembly 31 splits the incident light into three primary color lights, so RGB single primary color light is input to the black-and-white image sensor, and the black-and-white image sensor may directly and respectively output the R, G and B primary color lights to three primary color channels corresponding to pixel points of the display screen. In this way, the display processing element unnecessarily performs other processing such as demosaic processing and other operations on light rays output by the black-and-white image sensor, and the image generation efficiency is higher. As three channels of the pixel points respectively receive the corresponding R, G and B primary color lights output by the black-and-white image sensor, the image processed based on the example of the present disclosure has no chromatic aberration, and the generated image is more vivid and clearer.

In the example of the present disclosure, only the RGB three primary color lights are used as the example for description. Those of skilled in the art should understand that hybrid light such as environmental light may further be split in other manners, for example, the environmental light may be split into yellow, red, green and black light and the like; and colors of the image are then restored according to different colors of light after splitting and thus the image can also be generated. In the example of the present disclosure, by arranging the light splitting structure of the light splitting assembly 31, it is ensured that lengths of optical paths of the split lights are equal, and the chromatic aberration generated when the colors are restored can be prevented.

As shown in FIG. 2A, a surface, attached to the first surface 37 of the light splitting element 33, of the first optical path compensation element 34 is provided with a slope corresponding to the first surface 37, such that the attached surface of the first optical path compensation element 34 is completely attached to the first surface 37. The other end of the first optical path compensation element 34 is a vertical end surface, and the cross section of the first optical path compensation element 34 is a trapezoidal shape.

As shown in FIG. 2A, a surface, attached to the second surface 38 of the light splitting element 33, of the second optical path compensation element 35 is provided with a slope corresponding to the second surface 38, such that the attached surface of the second optical path compensation element 35 is completely attached to the first surface 38. The cross section of the second optical path compensation element 35 is a triangular shape.

The light splitting element 33 may split the incident light into a first primary color light along the first optical path, split the remaining light after the first primary color light is split from the incident light into a second primary color light along the second optical path and a third primary color light along the third optical path. In the example of the present disclosure, the incident light includes RGB three primary color lights, the first primary color light refers to the B primary color light, the second primary color light refers to the R primary color light and the third primary color light refers to the G primary color light.

After the incident light is split by the first surface 37 of the light splitting element 33, the B primary color light is split independently; the remaining light is composed of RG two primary color lights, and separates from the B primary color light along the optical path shown in FIG. 2A. The RG hybrid light is split again by the second surface 38 of the light splitting element 33 to form R and G primary color lights.

In the example of the present disclosure, the first light splitting reflection layer and the second light splitting reflection layer may achieve different light splitting requirements by adjusting the component, thickness and the like of the light-splitting coating film, provided that the R primary color light, the G primary color light and the B primary color light are split.

In the example of the present disclosure, the incident light is split into corresponding RGB three primary color channels, such that the three primary color lights are directly projected to corresponding black-and-white image sensors. In this way, a color filter of the sensor can be effectively prevented from filtering incident light in a channel of each primary color light, thereby effectively improving the light entering amount and achieving nearly lossless light incidence. By compensating optical paths of the three primary color lights, optical distances that the three primary color lights are projected to the corresponding black-and-white image sensors are equal, such that corresponding chromatic aberration when the colors are restored can be fully prevented. In the example of the present disclosure, the three primary color lights enter through one optical system, are then split into RGB three color channels and are independently sensed by three black-and-white sensors, such that the light may be directly output to RGB channels of each pixel of the corresponding screen to achieve nearly lossless image generation and display.

Figure 3:
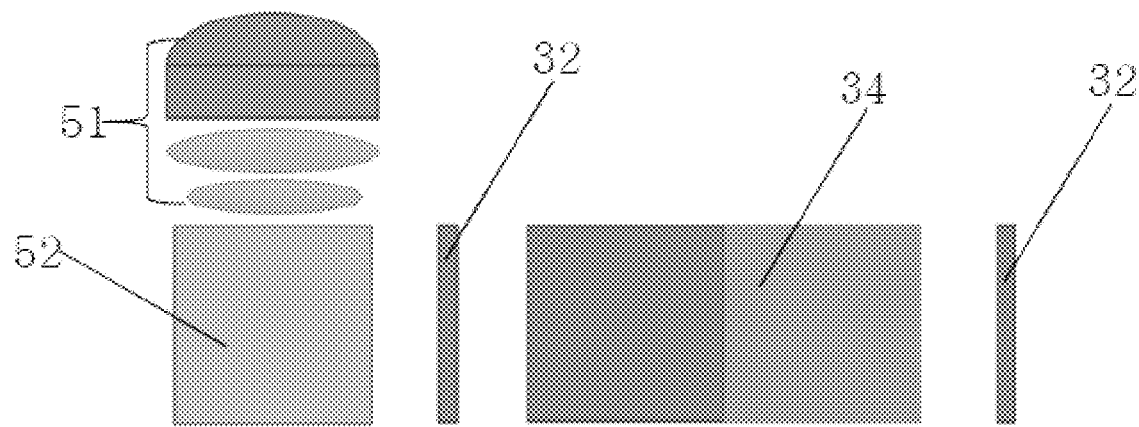
FIG. 3 is a structural diagram showing a camera module according to an example of the present disclosure.
Figure 4:
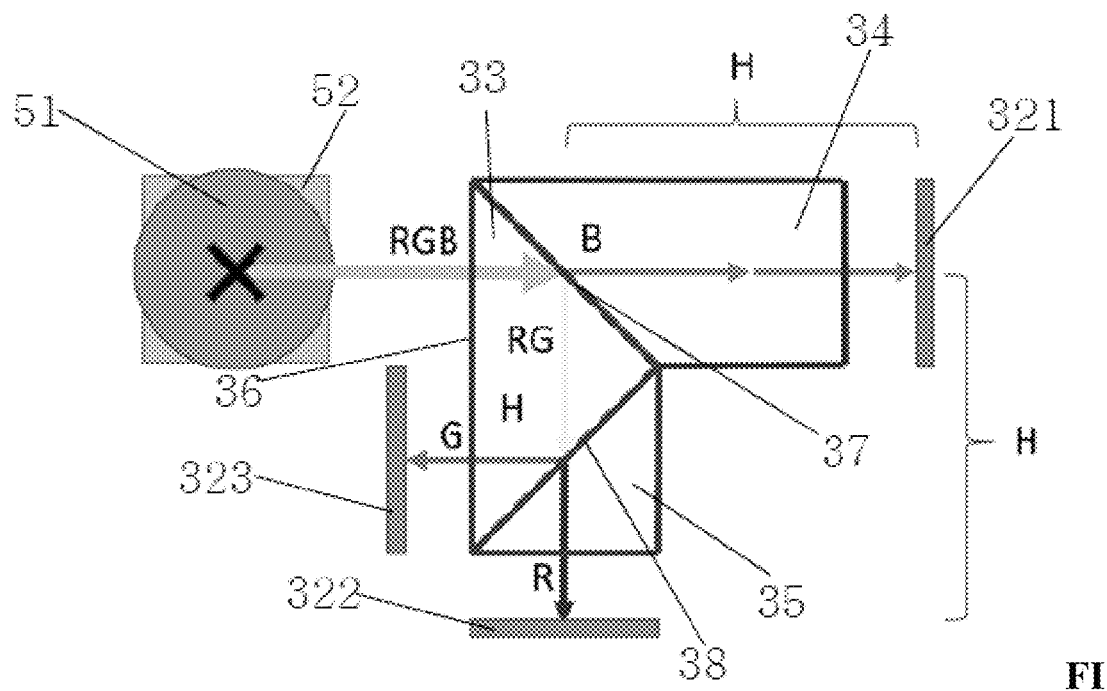
FIG. 4 is a structural diagram showing a camera module according to an example of the present disclosure.

FIG. 3 is a structural diagram showing a camera module according to an example of the present disclosure. FIG. 4 is a top structural diagram of a camera module shown in FIG. 3. As shown in FIG. 3 and FIG. 4, the camera module in the example of the present disclosure may include a lens group 51 and the optical processing apparatus in the above examples.

The lens group 51 is configured to focus an object to be captured, collect reflected light of the object to be captured and output the reflected light to the optical processing apparatus.

In the example of the present disclosure, the lens group 51 may further have an optical anti jitter function, i.e., after the object to be captured is focused, the optical anti jitter function is started such that when the reflected light of the object to be captured is collected, the unstable light input due to jitter can be prevented.

The optical processing apparatus is configured to receive incident light output by the lens group.

The camera module in the example of the present disclosure is further provided with an optical path adjustment element 52, disposed on an optical path between the lens group 51 and the light splitting assembly, and configured to receive the light collected by the lens group 51 and change an optical path of the light such that the incident light enters the optical processing apparatus in a first direction. Herein, the first direction is best a direction perpendicular to the light splitting assembly, and certainly, may also be a direction approximately perpendicular to the light splitting assembly.

As shown in FIG. 4, RGB primary color lights in the hybrid light are split by the light splitting assembly 32 to form R, G and B primary color lights, and optical path lengths of the three primary color lights are completely equal.

In the example of the present disclosure, only the RGB three primary color lights are used as the example for description. Those of skilled in the art should understand that hybrid light such as environmental light may further be split in other manners, for example, the environmental light may be split into yellow, red, green and black light and the like; and colors of the image are then restored according to different colors of light after splitting and thus the image can also be generated. In the example of the present disclosure, by arranging the light splitting structure of the light splitting assembly, it is ensured that lengths of optical paths of the split lights are equal, and the chromatic aberration generated when the colors are restored can be prevented.

In the example of the present disclosure, the optical path adjustment element 52 is also a prism. When the environmental light collected by the lens group 51 and reflected by the object to be captured and the like enters the optical path adjustment element 52, the incident optical path is changed and the light enters towards the incident surface of the light splitting assembly 32.

As shown in FIG. 4, in the camera module shown in the example of the present disclosure, with a case where the hybrid light includes three primary color lights as an example, the light splitting assembly may include a light splitting element 33.

The light splitting element 33 is disposed on the optical path of the incident light, and capable of splitting the incident light into a first primary color light along the first optical path, and splitting the remaining light after the first primary color light is split from the incident light into a second primary color light along the second optical path and a third primary color light along the third optical path.

In the example of the present disclosure, with the incident light includes RGB three primary color lights as an example, the first primary color light may refer to the B primary color light, the second primary color light may refer to the R primary color light and the third primary color light may refer to the G primary color light.

After the hybrid light is split by the first surface 37 of the light splitting element 33, the B primary color light is split independently; the remaining light is composed of RG two primary color lights, and separates from the B primary color light along the optical path shown in FIG. 4. The RG hybrid light is split again by the second surface 38 of the light splitting element 33 to form R and G primary color lights.

In the example of the present disclosure, the light splitting assembly 31 splits the incident light into three primary color lights, so RGB single primary color light is input to the black-and-white image sensor, and the black-and-white image sensor may directly and respectively output the R, G and B primary color lights to three primary color channels corresponding to pixel points of the display screen. In this way, the display processing element unnecessarily performs other processing such as demosaic processing and other operations on light rays output by the black-and-white image sensor, and the image generation efficiency is higher. As three channels of the pixel points respectively receive the corresponding R, G and B primary color lights output by the black-and-white image sensor, the image processed based on the example of the present disclosure has no chromatic aberration, and the generated image is more vivid and clearer.

Structures and functions of remaining components in the optical processing apparatus shown in the example of the present disclosure are the completely same as those of the components in the foregoing example, and will not be elaborated herein.

Figure 5:
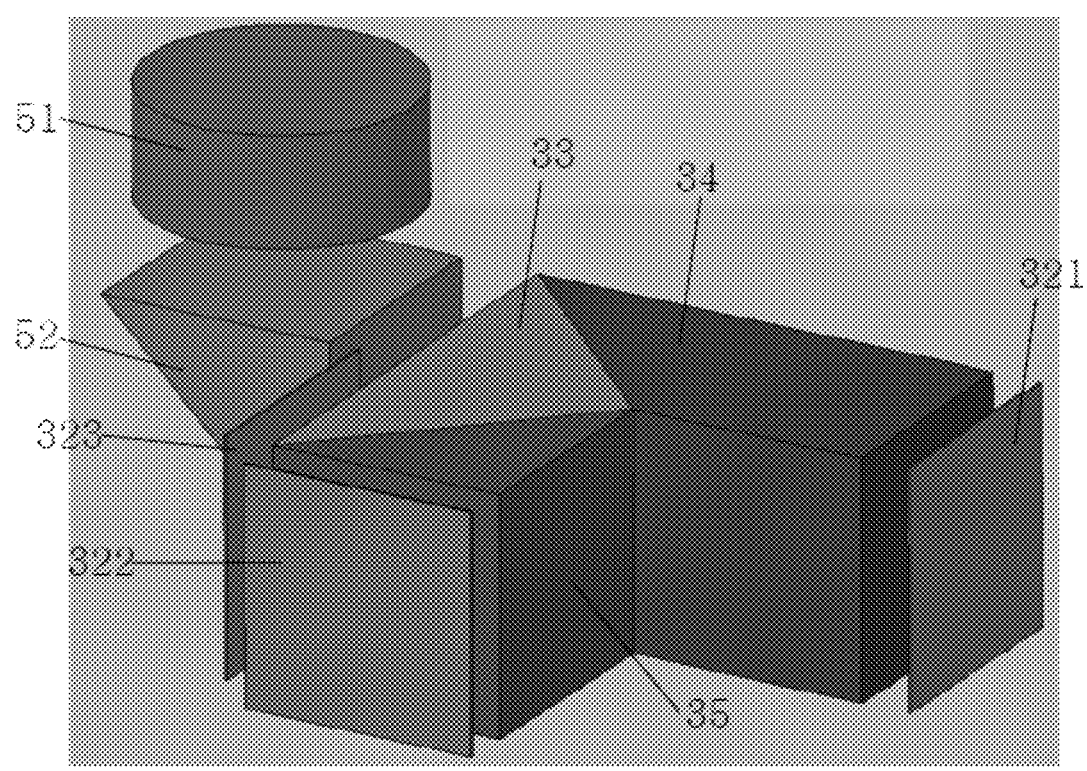
FIG. 5 is a stereoscopic structural diagram showing a camera module according to an example of the present disclosure.

FIG. 5 is a stereoscopic structural diagram showing a camera module according to an example of the present disclosure. As shown in FIG. 5, the optical path adjustment element 52 in the example of the present disclosure is of a triangular prism. The hybrid light enters the optical path adjustment element 52 in the example of the present disclosure through the lens group 51, and is reflected to the light splitting element 33 on a slope of the triangular prism; and in the light splitting element 33, the incident light is split into three primary color lights, and respectively enters the first optical sensor 321, the second optical sensor 322 and the third optical sensor 323. Herein, the first optical sensor 321, the second optical sensor 322 and the third optical sensor 323 are all black-and-white sensors.

In the example of the present disclosure, the incident light is split into corresponding RGB three primary color channels, such that the three primary color lights are directly projected to corresponding black-and-white image sensors. In this way, a color filter of the sensor can be effectively prevented from filtering incident light in a channel of each primary color light, thereby effectively improving the light entering amount and achieving nearly lossless light incidence. By compensating optical paths of the three primary color lights, optical distances that the three primary color lights are projected to the corresponding black-and-white image sensors are equal, such that corresponding chromatic aberration when the colors are restored can be fully prevented. In the example of the present disclosure, the three primary color lights enter through one optical system, are then split into RGB three color channels and are independently sensed by three black-and-white sensors, such that the light may be directly output to RGB channels of each pixel of the corresponding screen to achieve nearly lossless image generation and display.

The examples of the present disclosure further describe an image capturing method of an electronic device, which is implemented based on the camera module and the optical processing apparatus in the foregoing examples. The method may include the following operations.

A first input is received.

In response to the first input, at least two frames of images formed by respectively sensing at least two waveband light are acquired, a difference between optical path lengths of respective waveband lights in a light splitting assembly being less than a set threshold.

A target image of the captured object is generated according to the at least two frames of images.

Herein, the first input may be an image capturing operation for the electronic device, such as a click or press operation on a capturing button of the electronic device; and in response to the image capturing operation, the first input is generated.

Optionally, the at least two waveband lights may include a first waveband light, a second waveband light and a third waveband light.

The operation that the target image of the captured object is generated according to the at least two frames of images may include the following operation.

Images formed by sensing the first waveband light, the second waveband light and the third waveband light are respectively output through corresponding color channels to generate the target image.

Herein, the first waveband light is one of an R primary color light, a G primary color light and a B primary color light; the second waveband light is one of the R primary color light, the G primary color light and the B primary color light; and the third waveband light is one of the R primary color light, the G primary color light and the B primary color light. The first waveband light, the second waveband light and the third waveband light are different from each other.

By splitting the incident light into the R, G and B primary color lights, the light received by the black-and-white image sensor is the single primary color light in the RGB, so the black-and-white image sensor may directly and respectively output the R, G and B primary color lights to three primary color channels corresponding to pixel points of the display screen. In this way, the display processing element unnecessarily performs other processing such as demosaic processing and other operations on light rays output by the black-and-white image sensor, and the image generation efficiency is higher. As three channels of the pixel points respectively receive the corresponding R, G and B primary color lights output by the black-and-white image sensor, the image processed based on the example of the present disclosure has no chromatic aberration, and the generated image is more vivid and clearer.

The image capturing method in the example of the present disclosure may be understood with reference to the related descriptions on the foregoing optical processing apparatus and camera module.

Figure 6:
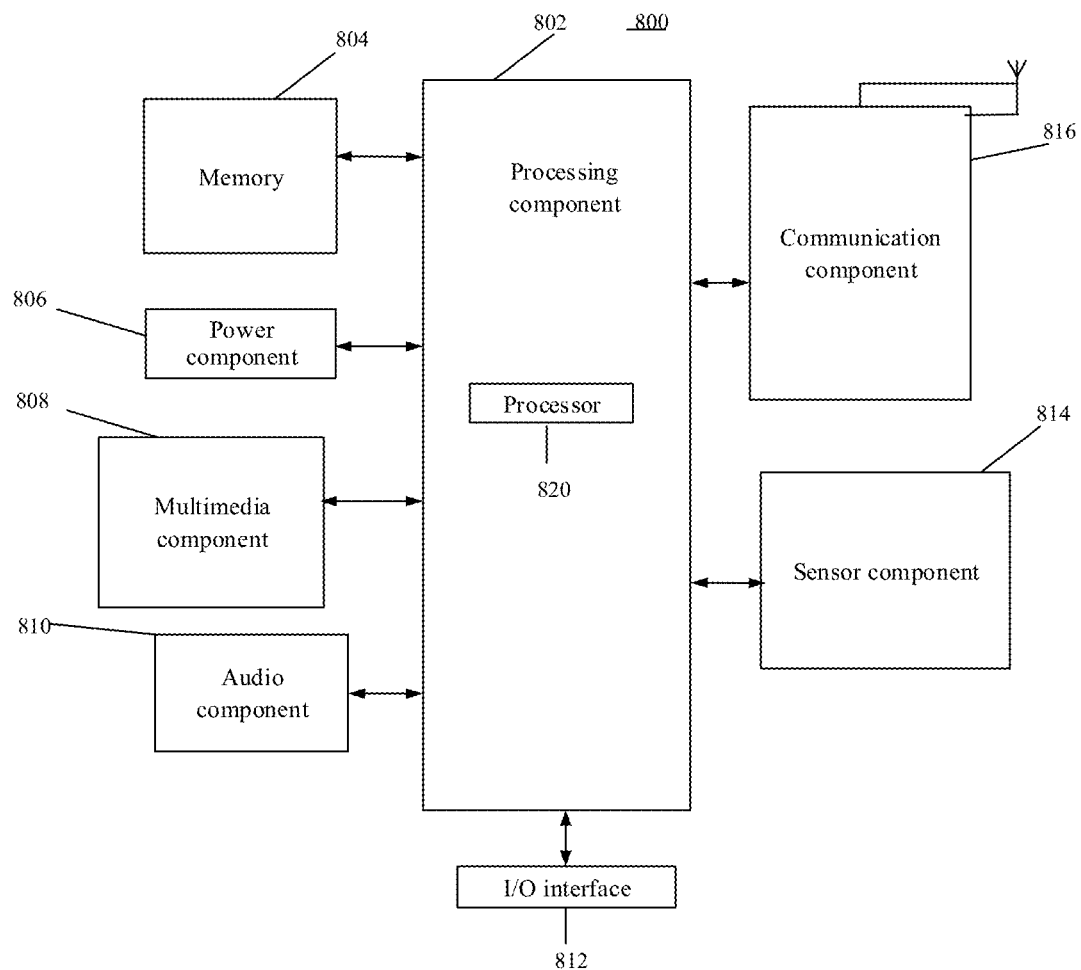
FIG. 6 is a block diagram showing an electronic device according to an example of the present disclosure.

FIG. 6 is a block diagram showing an electronic device 800 according to an example. As shown in FIG. 6, the electronic device 800 supports multi-screen output, and the electronic device 800 may include one or more of the following components: a processing component 802, a memory 804, a power component 806, a multimedia component 808, an audio component 810, an Input/Output (I/O) interface 812, a sensor component 814, and a communication component 816. The electronic device in the example of the present disclosure may be a mobile phone, a gaming machine, a wearable device, a virtual reality device, a Personal Digital Assistant (PDA), a tablet computer, a television terminal or the like. A camera is provided in the electronic device. The camera uses the camera module structure in the foregoing example.

The processing component 802 typically controls overall operations of the electronic device 800, such as the operations associated with display, telephone calls, data communications, camera operations, and recording operations. The processing component 802 may include one or more processors 820 to execute instructions to perform all or part of the steps in the method of the above examples. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any application or method operated on the electronic device 800, contact data, phonebook data, messages, pictures, videos, etc. The memory 804 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 806 provides power to various components of the electronic device 800. The power component 806 may include a power management system, one or more power sources, and any other components associated with the generation, management, and distribution of power in the electronic device 800.

The multimedia component 808 includes a screen providing an output interface between the electronic device 800 and the user. In some examples, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some examples, the multimedia component 808 includes a front camera and/or a rear camera. The front camera and/or the rear camera may receive external multimedia data when the apparatus 800 is in an operation mode, such as a capturing mode or a video mode. Each of the front camera and the rear camera may be a fixed optical lens system or have focus and optical zoom capability. The front camera and/or the rear camera may use the camera module described in the above example.

The audio component 810 is configured to output and/or input audio signals. For example, the audio component 810 includes a Microphone (MIC) configured to receive an external audio signal when the electronic device 800 is in an operation mode, such as a call mode, a recording mode, and a voice recognition mode. The received audio signal may further be stored in the memory 804 or transmitted via the communication component 816. In some examples, the audio component 810 further includes a speaker configured to output audio signals.

The I/O interface 812 provides an interface between the processing component 802 and peripheral interface modules. The peripheral interface modules may be a keyboard, a click wheel, buttons, and the like. The buttons may include, but are not limited to, a home button, a volume button, a starting button, and a locking button.

The sensor component 814 includes one or more sensors to provide status assessments of various aspects of the electronic device 800. For instance, the sensor component 814 may detect an open/closed status of the device 800 and relative positioning of components, e.g., the component is the display and the keypad of the electronic device 800, and the sensor component 814 may further detect a change in position of the electronic device 800 or a component of the electronic device 800, a presence or absence of user contact with the electronic device 800, an orientation or an acceleration/deceleration of the electronic device 800, and a change in temperature of the electronic device 800. The sensor component 814 may include a proximity sensor, configured to detect the presence of nearby objects without any physical contact. The sensor component 814 may also include an optical sensor, such as a Complementary Metal Oxide Semiconductor (CMOS) or Charge Coupled Device (CCD) image sensor, configured for use in an imaging application. In some examples, the sensor component 814 may also include an accelerometer sensor, a gyroscope sensor, a magnetic sensor, a pressure sensor, or a temperature sensor.

The communication component 816 is configured to facilitate wired or wireless communication between the electronic device 800 and another device. The electronic device 800 may access a communication-standard-based wireless network, such as a Wireless Fidelity (Wi-Fi) network, a 2nd-Generation (2G) or 3rd-Generation (3G) network or a combination thereof. In one example, the communication component 816 receives a broadcast signal or broadcast associated information from an external broadcast management system via a broadcast channel. In one example, the communication component 816 further includes a near field communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In an example, the electronic device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components.

In an example, a non-temporary computer-readable storage medium including an instruction is further provided, for example, the memory 804 including the instruction. The instruction may be executed by the processor 820 of the electronic device 800 to complete the method of the above example. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

The technical solutions provided by the examples of the present disclosure may have the following beneficial effects.

In the examples of the present disclosure, by splitting the incident light into at least two waveband lights, a color filter of the light sensing assembly can be effectively prevented from filtering the incident light in each waveband light channel, thereby effectively improving the light entering amount and achieving nearly lossless light incidence, and by enabling an optical distance that each waveband light in the at least two waveband lights is projected to the corresponding light sensing assembly to be equal, corresponding chromatic aberration when colors of the waveband light are restored can be effectively prevented, thereby improving generation and display effects of the image.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes may be made without departing from the scope thereof.

What is claimed is:

1. An optical processing apparatus, comprising:
   a light splitting assembly, disposed on an optical path of an incident light and configured to receive the incident light and split the incident light into at least two lights with different waveband, a difference between optical path lengths of at least two optical paths, respectively from an incident surface of the light splitting assembly where the incident light enters to surfaces of the light splitting assembly where the least two lights emit, being less than a set threshold; and
   a light sensing assembly, disposed on optical paths of the at least two lights and configured to receive the at least two lights;
   wherein the light splitting assembly comprises:
   a light splitting element, disposed on the optical path of the incident light and configured to split the incident light into a first light with a first waveband, a second light with a second waveband and a third light with a third waveband;
   wherein the light splitting element is a triangular prism and has the incident surface, a first surface and a second surface respectively corresponding to three side surfaces of the triangular prism, from which the third light with the third waveband, the first light with the first waveband and the second light with the second waveband emit respectively.

2. The apparatus of claim 1, wherein: the incident surface is located on the optical path of the incident light, and configured to transmit the incident light; a first light splitting reflection layer is disposed on the first surface, and the incident light is split through the first light splitting reflection layer to form the first light with the first waveband along part of a first optical path after the first light splitting reflection layer and a fourth light with a fourth waveband along a fourth optical path; a second light splitting reflection layer is disposed on the second surface, and the fourth light with the fourth waveband is split through the second light splitting reflection layer to form the second light with the second waveband split along part of a second optical path after the second light splitting reflection layer and the third light with the third waveband reflected along part of a third optical path after the second light splitting reflection layer; and the third light with the third waveband is reflected by the second light splitting reflection layer and emit from the incident surface along a direction reverse to an incident direction of the incident light.

3. The apparatus of claim 1, wherein the light splitting assembly further comprises:
a first optical path compensation element, disposed on a light emitting path of the first light with the first waveband and configured to compensate an optical path of the first light with the first waveband; and
a second optical path compensation element, disposed on a light emitting path of the second light with the second waveband and configured to compensate an optical path of the second light with the second waveband, wherein
the optical path of the first light with the first waveband and the optical path of the second light with the second waveband are compensated, such that optical path lengths of the first optical path, the second optical path and the third optical path are equal.

4. The apparatus of claim 3, wherein the first optical path compensation element is attached to the first surface, and the second optical path compensation element is attached to the second surface.

5. The apparatus of claim 4, wherein:
the first optical path is an optical path from the incident surface where the incident light enters to a surface of the first optical path compensation element where the first light with the first waveband emits;
the second optical path is an optical path from the incident surface where the incident light enters to a surface of the second optical path compensation element where the second light with the second waveband emits; and
the third optical path is an optical path from the incident surface where the incident light enters to a surface of the light splitting element where the third light with the third waveband emits.

6. The apparatus of claim 3, wherein the light sensing assembly comprises:
a first optical sensor, configured to receive the first light with the first waveband;
a second optical sensor, configured to receive the second light with the second waveband; and
a third optical sensor, configured to receive the third light with the third waveband.

7. The apparatus of claim 6, wherein:
an optical path from an incident position of the light splitting element at which the incident light enters to a receiving position of the first optical sensor is a fifth optical path;
an optical path from the incident position of the light splitting element at which the incident light enters to a receiving position of the second optical sensor is a sixth optical path; and
an optical path from the incident position of the light splitting element at which the incident light enters to a receiving position of the third optical sensor is a seventh optical path,
wherein optical path lengths of the fifth optical path, the sixth optical path and the seventh optical path are equal.

8. The apparatus of claim 7, wherein the fifth optical path is more than the first optical path by a first length, and the first length is an optical path length of the first light with the first waveband from a surface of the first optical path compensation element where the first light with the first waveband emits to the first optical sensor.

9. The apparatus of claim 7, wherein the sixth optical path is more than the second optical path by a second length, and the second length is an optical path length of the second light with the second waveband from a surface of the second optical path compensation element where the second light with the second waveband emits to the second optical sensor.

10. The apparatus of claim 7, wherein the seventh optical path is more than the third optical path by a third length, and the third length is an optical path length of the third light with the third waveband from a surface of the light splitting element where the third light with the third waveband emits to the light splitting element.

11. The apparatus of claim 6, wherein:
the first optical path compensation element is a prism, and the second optical path compensation element is a prism; and
the first optical sensor, the second optical sensor and the third optical sensor are all black-and-white image sensors.

12. The apparatus of claim 1, wherein:
the first light with the first waveband is one of a red primary color light, a green primary color light or a blue primary color light, the second light with the second waveband is one of the red primary color light, the green primary color light or the blue primary color light, and the third light with the third waveband is one of the red primary color light, the green primary color light or the blue primary color light; and
the first light with the first waveband, the second light with the second waveband and the third light with the third waveband are different from each other.

13. A camera module, comprising: a lens group and an optical processing apparatus; and wherein:
the lens group is configured to focus an object to be captured, collect reflected light of the object to be captured and output the reflected light to the optical processing apparatus; and
wherein the optical processing apparatus is configured to receive an incident light output by the lens group and comprises:
a light splitting assembly, disposed on an optical path of an incident light and configured to receive the incident light and split the incident light into at least two lights with different waveband, a difference between optical path lengths of at least two optical paths waveband lights, respectively from an incident surface of the light splitting assembly where the incident light enters to surfaces of the light splitting assembly where the least two lights emit, being less than a set threshold; and
a light sensing assembly, disposed on optical paths of the at least two lights and configured to receive the at least two lights;
wherein the light splitting assembly comprises:

a light splitting element, disposed on the optical path of the incident light and configured to split the incident light into a first light with a first waveband, a second light with a second waveband and a third light with a third waveband;

wherein the light splitting element is a triangular prism and has the incident surface, a first surface and a second surface respectively corresponding to three side surfaces of the triangular prism, from which the third light with the third waveband, the first light with the first waveband and the second light with the second waveband emit respectively.

14. The camera module of claim 13, further comprising:
an optical path adjustment element, disposed on an optical path between the lens group and the optical processing apparatus, and configured to receive the incident light collected by the lens group and change an optical path of the incident light such that the incident light enters the optical processing apparatus in a first direction.

15. The camera module of claim 14, wherein the first direction is a direction perpendicular to the light splitting assembly.

16. An image capturing method of an electronic device, comprising:
receiving a first input; and
acquiring, in response to the first input, at least two frames of images formed by respectively sensing at least two lights with different waveband, a difference between optical path lengths of the at least two optical paths, respectively from an incident surface of a light splitting assembly in the electronic device where an incident light enters to surfaces of the light splitting assembly where the least two lights emit, being less than a set threshold; and
generating a target image of a captured object according to the at least two frames of images,
wherein:
sensing the at least two lights with different wavebands comprises: sensing a first light with a first waveband, a second light with a second waveband and a third light with a third waveband which are obtained by splitting the incident light through a light splitting element in the light splitting assembly; and
wherein the light splitting element is a triangular prism has the incident surface, a first surface and a second surface respectively corresponding to three side surfaces of the triangular prism, from which the third light with the third waveband, the first light with the first waveband and the second light with the second waveband emit respectively.

17. The method of claim 16, wherein:
generating the target image of the captured object according to the at least two frames of images comprises:
outputting, through corresponding color channels, images formed by sensing the first light with the first waveband, the second light with the second waveband and the third light with the third waveband, to generate the target image.

18. The method of claim 17, wherein:
the first light with the first waveband is one of a red primary color light, a green primary color light or a blue primary color light, the second light with the second waveband is one of the red primary color light, the green primary color light or the blue primary color light, and the third light with the third waveband is one of the red primary color light, the green primary color light or the blue primary color light; and
the first light with the first waveband, the second light with the second waveband and the third light with the third waveband are different from each other.

19. The method of claim 16, wherein:
the electronic device comprises a camera module, and the camera module comprises a lens group and an optical processing apparatus; wherein
the lens group is configured to focus an object to be captured, collect reflected light of the object to be captured and output the reflected light to the optical processing apparatus; and
the optical processing apparatus is configured to receive an incident light output by the lens group and comprises:
the light splitting assembly, disposed on an optical path of the incident light and configured to receive the incident light and split the incident light into the at least two lights; and
a light sensing assembly, disposed on optical paths of the at least two lights and configured to receive the at least two lights.

* * * * *